United States Patent [19]

Smith

[11] Patent Number: 5,708,974
[45] Date of Patent: Jan. 13, 1998

[54] METHOD OF ALLOCATING RESOURCES EFFICIENTLY IN A SYSTEM WHICH DOES NOT PERMIT SWITCHING IN REAL TIME

[75] Inventor: David Anthony Smith, Guildford, United Kingdom

[73] Assignee: Telefonaktiebolaget LM Ericsson, Stockholm, Sweden

[21] Appl. No.: 537,230

[22] Filed: Sep. 29, 1995

[51] Int. Cl.$^6$ .............................. H04B 1/00; H04B 7/00; H04Q 7/00

[52] U.S. Cl. .................. 455/62; 455/33.1; 455/56.1; 379/60

[58] Field of Search ........................ 455/33.1, 34.1, 455/34.2, 53.1, 56.1, 62; 379/59, 60

[56] References Cited

U.S. PATENT DOCUMENTS

| | | | |
|---|---|---|---|
| 4,670,899 | 6/1987 | Brody et al. | 379/60 |
| 5,134,709 | 7/1992 | Bi et al. | 455/33.1 |
| 5,507,007 | 4/1996 | Gunmar et al. | 455/56.1 |

FOREIGN PATENT DOCUMENTS

| | | |
|---|---|---|
| 637 895 | 2/1995 | European Pat. Off. . |
| WO94/00959 | 1/1994 | WIPO . |
| WO94/28644 | 12/1994 | WIPO . |

*Primary Examiner*—Reinhard J. Eisenzopf
*Assistant Examiner*—Sam Bhattacharya
*Attorney, Agent, or Firm*—Burns, Doane, Swecker & Mathis, L.L.P.

[57] ABSTRACT

A method for establishing connections between one node and a plurality of other nodes sharing transmission resources is disclosed. A small subset of the total channels available is switched through (preconfigured) from the common node to each of the plurality of remote nodes, without any specific use for these channels being apparent, i.e., the preconfigured channels are idle. All remaining channels being retained as unswitched reserves which are as yet uncommitted. These preconfigured channels act as a buffer stock of transmission resources, which decouples the need to be able to use a connection rapidly from the time taken to configure that connection.

12 Claims, 6 Drawing Sheets

- - - - PRECONFIGURED BUT IDLE
———— PRECONFIGURED AND IN USE

METHOD OF ALLOCATING RESOURCES EFFICIENTLY IN A SYSTEM WHICH DOES NOT PERMIT SWITCHING IN REAL TIME

FIELD OF THE INVENTION

The present invention relates to a method for allocating resources in a telephony system efficiently, and more particularly to a method for allocating resources efficiently in for example base station equipment and radio resources in a cellular radio telephony system which does not permit switching in real time.

BACKGROUND OF THE INVENTION

Transmission within a telephone system consists of a number of fixed communication channels which are essentially always there. Switching is then used to allow different users to use the fixed communication channels at different times. In such systems, there does not need to be a one-to-one correspondence between the number of users and the number of possible channels since all of the possible users will not be using their phones at the same time. For example, to allow anyone in one city to be able to call anyone in another city does not require a large number of cables, because at any one time the number of people who will be trying to place a call is relatively small, compared to the total size of the cities. Thus, the number of channels needed to connect two nodes is much less than the total number of possible channels that could be supported between those nodes, since statistically these channels are all not needed at the same time. In normal telephony, speech links are allocated on demand, in real time, these links being known as switched links.

Figure 1:
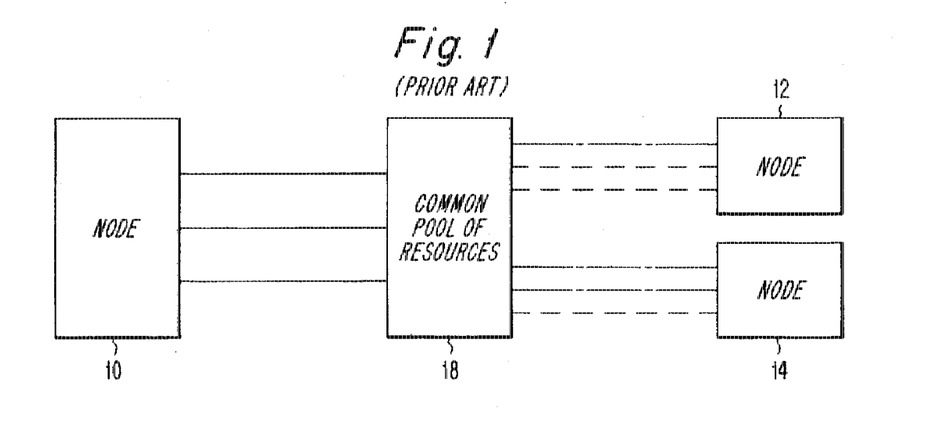
FIG. 1 illustrates a prior art telephony system.
Figure 2A:
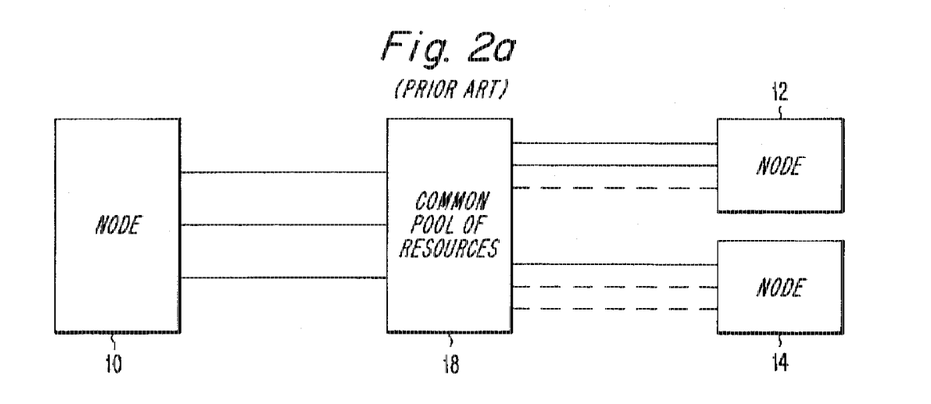
FIGS. 2a–2b illustrate a prior art telephony system.
Figure 2B:
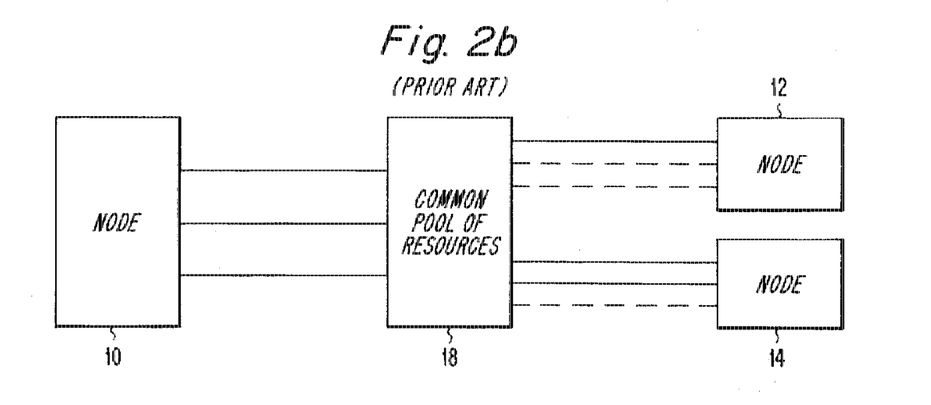

The above concept can be extended, to allow a number of nodes to share a number of transmission channels as a common resource. For example, consider a number of channels on a cable from one end of the country to another. At one time a channel is terminated in one city, at another time the cable is terminated in a second city further down the cable and perhaps at another time the cable is used right through its end on the coast. In this way, the transmission channels can be allocated to any one node to suit peak loading requirements at certain times, and re-allocated to another node to suit its peak loading requirements at another time. Providing the peak loading periods do not coincide, the system is able to support peak loads in each node such that the sum of these peak loads exceeds the total number of available transmission channels. For example, FIG. 1 illustrates a communications system with a total of three transmission channels that are used to connect a node 10 to two nodes 12 and 14 via a common pool of resources 18. Typically, this might be a switch. For example, as shown in FIG. 2a, the node 12 can be given two transmission channels, while the node 14 is given one channel during the peak periods for node 12. The opposite case, where two channels are switched through to node 14 and only one is switched to node 12 is shown in FIG. 2b. Thus, it can be seen that at different times the peak loading in each node 12 and 14 is two. Thus, the number of transmission channels need to give a peak capability of two in each right hand node 12 and 14 has been reduced from 4 to 3 at the expense of not permitting both node 12 and node 14 to peak simultaneously.

This effect is known as trunking efficiency and is widely used in switched systems to improve the efficiency of systems dimensioned for a given probability of link congestion, typically 2% or less. The ratio of channels needed for a given peak load vs. confidence are defined in Erlang tables, and are very heavily affected by scaling. That is to say that in a large system for a given confidence, the number of channels needed is only slightly greater than the peak number of calls in progress, but in small systems the excess becomes very large.

However, not all communications systems can be switched in real time in response to an explicit need, i.e., switching on demand. This can be for a variety of reasons but typically is because the configuration process is extended.

A specific example of this which is currently of substantial commercial interest is the configuration of transmission or other resources within cellular telephony systems. Specifically, this can be considered at two levels, the (cable) transmission between a control node such as a base station controller (BSC) and one of several base stations (BTS), and the configuration of the radio channels ultimately used to connect through to the mobile station.

In the former case, the equipment at the base station site is typically not designed to function as a real time switch, even if switching functionality is provided. Frequently, the signalling link controlling the base stations and any remote switch have very limited bandwidth in order to save transmission costs, and an implication of this is that it may take a significant amount of time to route any commands ordering a change in the setup of the switch, and to execute and acknowledge those commands. The net effect is that the transmission, if rerouting is possible at all, cannot be rerouted in real time.

In the latter case, the radio transmitters and receivers may have extended configuration times due to the need for accurate tuning of various parts of the radio system. Configuration may also only commence when a number of prerequisites have been completed, including extended initialization, testing and control program loading sequences, which may take several minutes to complete.

Ultimately, the connection towards the mobile station can be routed over a radio channel almost instantly, but it is important to be clear that the provision of that radio channel may take many minutes. Because of this, it is normal that all the channels in a cellular radio system are fully configured at all times, even when not carrying connections towards mobile stations, this including both terrestrial (cable) and radio channels, i.e., the calls seen by the subscribers are switched using resources which are essentially fixed (so called "semi-permanent") and thus trunking efficiency is not possible, and is not attempted. As a result, operators of cellular networks have very high transmission costs, despite the fact that much of the transmission resources are unused most of the time.

SUMMARY OF THE INVENTION

It is an object of the present invention to overcome the problems cited above by providing a method by which the trunking efficiency advantage of switched channels in a communications system can be realized in a system in which the channels are not switchable on demand, i.e., in real time as a response to an externally arising specific need for a communications channel.

According to one embodiment of the present invention, a method for establishing connections between one node and a plurality of other nodes sharing transmission resources is disclosed. A small subset of the total channels available is switched through (preconfigured) from the common node to each of the plurality of remote nodes, without any specific use for these channels being apparent, i.e., the preconfigured channels are idle. All remaining channels being retained as unswitched reserves which are as yet uncommitted. These preconfigured channels act as a buffer stock of transmission resources, which decouples the need to be able to use a connection rapidly from the time taken to configure that connection.

Whenever a specific need for a channel between the common node and one of the remote nodes arises, for example, a call which is to be carried in a telephony system, this need can be supported immediately on one of the preconfigured channels, reducing the size of the buffer stock of preconfigured channels. Accordingly, a process is initiated to configure one of the as yet uncommitted reserve resources to replenish this buffer stock. Similarly, whenever a used connection is no longer needed, that connection is returned to the buffer stock, increasing the size of the stock once more. As the stock becomes larger, preconfigured resources are deconfigured to return the transmission resources to the pool of uncommitted reserves, from where it can potentially be seized to support connections towards a different node at another time. In this way, each node is provided with a small buffer stock of transmission resources which can be used immediately, in a manner that allows the reconfigured resources to be allocated towards different nodes at different times, thus providing the trunking advantages of a switched system without the need to be able to configure resources in real time in order to be able to support connections arising in real time.

According to another embodiment of the present invention, another method of establishing connections between a node and a plurality of remote nodes sharing common transmission resources is disclosed. This method operates similarly to that described above, except that rather than a small subset of the available transmission being preconfigured, all available transmission is preconfigured, the preconfigured resources being used to support connections through to all the remote nodes, as evenly as possible. As explicit needs for connections arise, these can again be satisfied immediately by using one of the preconfigured channels towards the appropriate remote node, and as connections are no longer needed, the resource is released again becoming an idle channel.

A background process is used to continuously monitor the number of preconfigured connections towards each node, and is able to determine which are idle and which are busy at any given instant. This process evaluates the current distribution of preconfigured resources vs. the number of idle channels which are preconfigured towards each remote node, and if it decides that the allocation is unbalanced, the system can re-configure one or more channels to improve that balance. Again the purpose of the preconfigured channels is to act as a buffer to decouple the ability to support the need for a connection from the ability to configure on in real time, but in this case the buffers are as large as possible.

A further embodiment of the present invention is similar to that described above, however instead of seeking to balance the distribution of idle preconfigured channels between the remote nodes, the background process seeks to arrange for the distribution of idle channels to be based on a function of the statistical likelihood of demand for channels towards each specific remote node in the future, based on either the relative current or a statistical analysis of the relative past allocation of channels towards the remote nodes. Once more the purpose of the preconfigured channels is to act as a decoupling buffer, but in this case the size of the buffers is optimized against a prediction of the likelihood for future demands arising towards each specific remote node. In this way the likelihood of congestion is minimized.

DESCRIPTION OF THE DRAWINGS

These and other features and advantages of the present invention will be readily apparent to one of ordinary skill in the art from the following written description, used in conjunction with the drawings, in which.

DETAILED DESCRIPTION

The present invention will now be described with reference to a cellular communications system. It will be appreciated by one skilled in the art that the present invention can be applied to other systems where resources are supplied to meet a dynamic demand when the supply time scale is long compared to the response needed for the resource availability where the resources can be returned in the same state as they are supplied.

By way of example, the present invention will now be described with reference to the allocation of transmission for speech/data between a base station controller (BSC) and a plurality of base stations (BTS) in a cellular radio system built according to the GSM recommendations. This interface is known as the Abis interface. It will be appreciated by one skilled in the art that the present invention can be applied to the allocation of transmission between nodes of any type in any switchable communications system, although it is only of interest in cases where the time taken to connect such a switched path is longer than the time available when establishing a communications channel over that switched transmission path. More generally, this principle of preconfiguration may be applied to any common resource which is shared between a number of users or uses, where some specific action is needed to configure and deconfigure that resource such that it is in a different state when configured for each use or user, or when unconfigured.

Figure 3A:
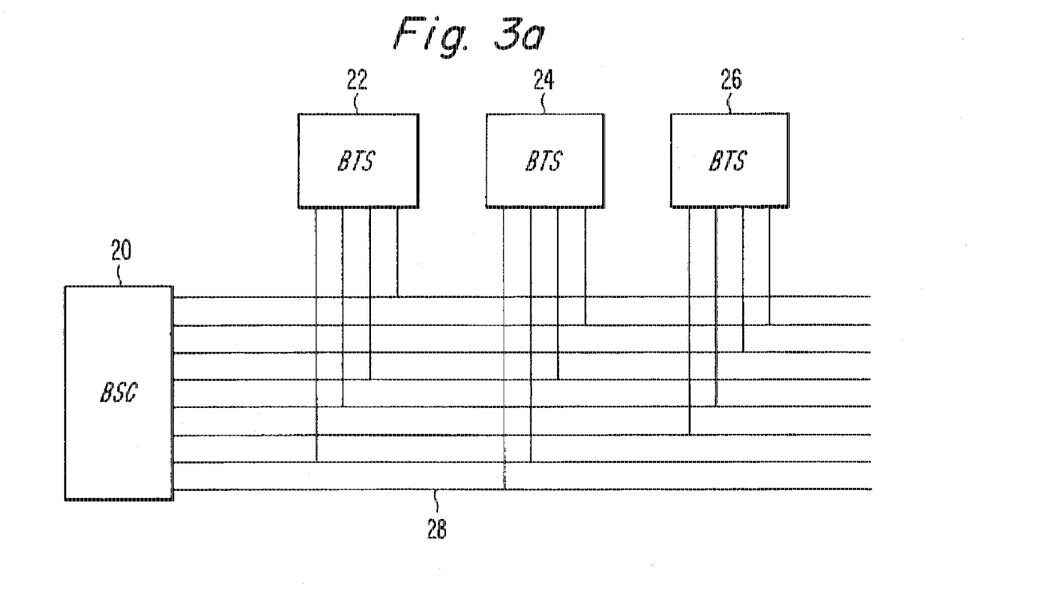
FIGS. 3a–3b illustrates a cellular communications system according to one embodiment of the present invention.
Figure 3B:
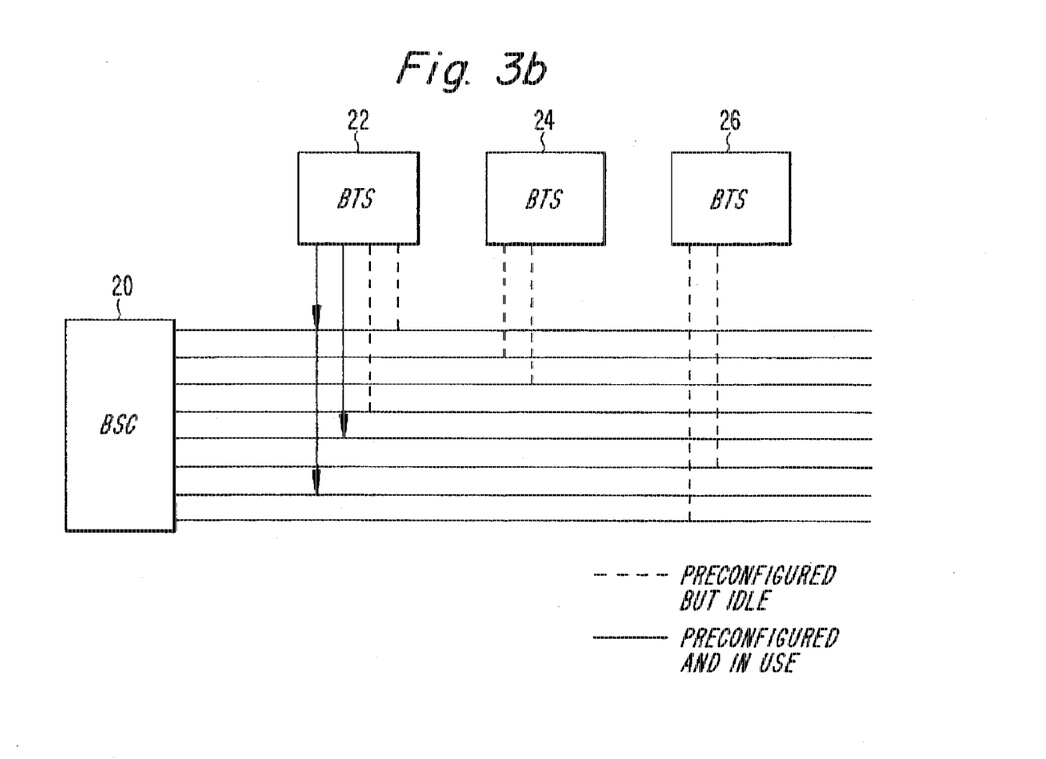
Figure 4:
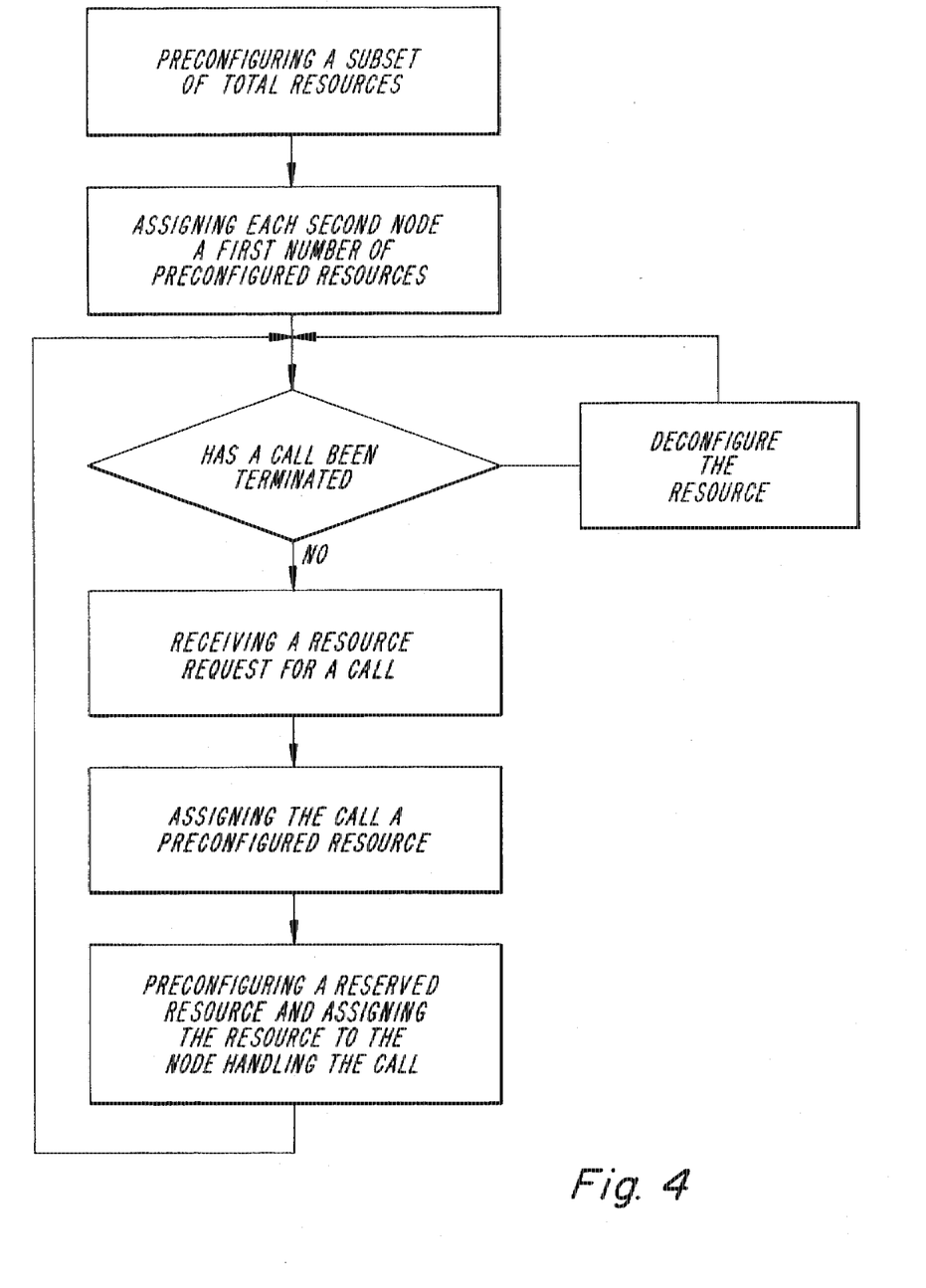
FIG. 4 illustrates a flow chart describing an allocation process according to one embodiment of the present invention.

One embodiment of the present invention will now be described with reference to FIGS. 3a–3b and 4, which illustrates a BSC 20 connected to several BTS 22, 24, and 26 by way of a common set of transmission resources 28, for example eight channels, which can be switched at a point remote from the BSC 20. According to the present invention, there is currently no explicit need for any communications between the BSC 20 and the BTS 22, 24, and 26 when the system is to be initialized. The system will preconfigure a small number of channels between the BSC 20 and each BTS, for example two channels each, leaving the remaining channels unconfigured. This is illustrated in FIG. 3a.

When a call arises, for example in BTS 22, there is an explicit need for a transmission resource. This can be immediately satisfied by using one of the two channels which is already preconfigured, but this will reduce the buffer of preconfigured channels to just one. Accordingly, a process is initiated to configure one of the remaining unconfigured channels, although this will take some time to complete. During this time, a second call may arise in the same BTS. This can also be immediately supported by making use of the remaining preconfigured channel. This reduces the supply of preconfigured channels to zero, and again the configuration process for a replacement is started. After some time, these two ordered configurations complete and the BTS 22 again has a buffer of 2 idle channels in addition to the two channels which are busy, i.e., four channels compared to the two channels at each of the other BTS. This is illustrated in FIG. 3b.

Eventually, the two calls will terminate. This leaves four idle channels in the BTS 22. However, it may be that the other BTS have initiated the configuration of replacement channels of their own channels, yet these requirements cannot be satisfied since there are no uncommitted channels available. The system will therefore initiate the deconfiguration process to deconfigure channels whenever the pool of configured resources which is idle is greater than some threshold value, which might in this example be set to two, the threshold below which we initiate configuration of additional resources, in this example, to return them to the pool of unconfigured channels so that they can be seized by another BTS at a later time. In this way, the transmission resources available can be redistributed between the plurality of BTS sites in response to explicit needs for transmission arising and decaying at each BTS site.

For example, a BSC may support three BTS, one covering an industrial center, one covering a residential area, and one covering a shopping center. During the week, there is substantial cellular traffic in the industrial area between 9 am and 5 pm. On Saturday, there is substantial cellular traffic in the rural and shopping areas. At other times, cellular traffic is mostly in the residential area. In a transmission network which can be switched in real time such as the PSTN, the number of channels which would be needed to support these three areas as a whole would be equal to the maximum number of calls which are made at any one time, totalled across all three areas. However, cellular equipment cannot typically be switched in real time, so today the total number of channels allocated in a cellular system is the total of the peak number of channels needed in each of the three zones individually, even though those peaks typically arise at different times. Using the present invention, the number needed is approximately the total number of calls made at any one time across all three areas, as in the switched on demand system, plus the size of the buffers for each area, i.e., 3 multiplied by 2 channels in our example. Note that under limiting conditions the channels in the buffer can be used without being replaceable, without losses occurring, and it is possible for losses to arise in one node due to an inability to replace channels taken from the buffer because of a lack of uncommitted resources, when there are preconfigured but idle resources in the buffer of another. Thus, it is seen that this invention is more efficient than non-switched systems, but is less efficient than systems which can be switched on demand for a given confidence level.

In any underdimensioned switched system, there is always a chance that the system will be congested, i.e., that the demand for transmission will exceed the supply. Trunking efficiency is based on the ability to underdimension the system in this way, thereby reducing the resources needed and thus reducing costs, but in a statistically extreme case all nodes could simultaneously demand transmission and congestion will occur. In a sense therefore it could be said that the system operator is taking a small chance, risking the subscribers ability to make a call (mostly at peak periods), in return for a (substantial) reduction in the costs of providing the system, which they may or may not pass on to the subscriber in due course. This is well known and understood, such losses in a real time switched system being described by Erlang tables, which define the relationship between confidence levels, mean traffic loading, and the number of channels available.

In the context of the present invention, further statistical treatment becomes apparent. Losses only occur when a need arises in a particular node, when there are no preconfigured channels available. This may be because either there are no uncommitted resources available to configure to replace the preconfigured channels in the buffer which have become busy, or because they have not yet finished being configured. Thus, it is apparent that the time taken to configure a channel has an effect on the statistical confidence limit of a channel being available, etc. It is found that for a given mean traffic loading, the shorter the configuration time, or the bigger the nominal buffer size, the greater the confidence with which a channel can be allocated. Conversely, the bigger the buffer, the more channels are needed, and therefore the efficiency of the system is reduced. Thus one skilled in the art will appreciate that in this present invention as in all trunking efficiency systems, the confidence level in any system for a given loading is a function of the resources available, i.e., the cost to the operator. The purpose of this invention is to allow the operator to choose for themselves the optimum balance of confidence vs. costs, which has not previously been possible in systems built out of resources which could not be configured in real time.

In this embodiment, the nominal size of the buffer is fixed, configuration of further channels and deconfiguration of excess channels being initiated by the number of idle channels, allowing for any channels already being configured or deconfigured, exceeding certain fixed threshold values. All remaining channels are uncommitted. It has been shown above that increasing the size of the buffer increases the statistical confidence limits of the system. It is therefore inefficient to have uncommitted channels. Alternative embodiments of the present invention therefore always commit all channels, but distribute those channels in a variety of methods as will be explained below.

Figure 5:
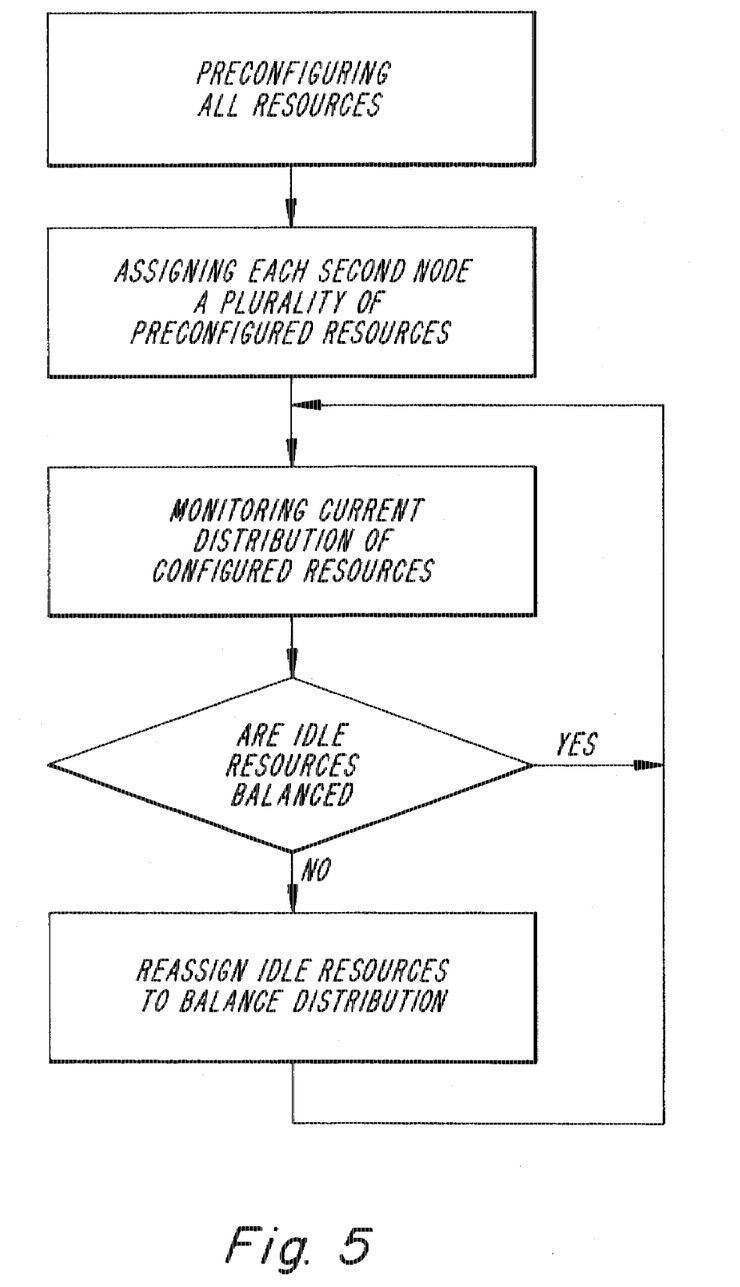
FIG. 5 illustrates a flow chart describing an allocation process according to another embodiment of the present invention.

According to another embodiment of the present invention, another method of establishing connections between a node and a plurality of remote nodes sharing common transmission resources is disclosed and is illustrated in FIG. 5. This method operates similarly to that described above, except that rather than a small subset of the available transmission being preconfigured, all available transmission is preconfigured, the preconfigured resources being used to support connections through to all the remote nodes, as evenly as possible. As explicit needs for connections arise, these can again be satisfied immediately by using one of the preconfigured channels towards the appropriate remote node, and as connections are no longer needed, the resource is released again becoming an idle channel.

Figure 6A:
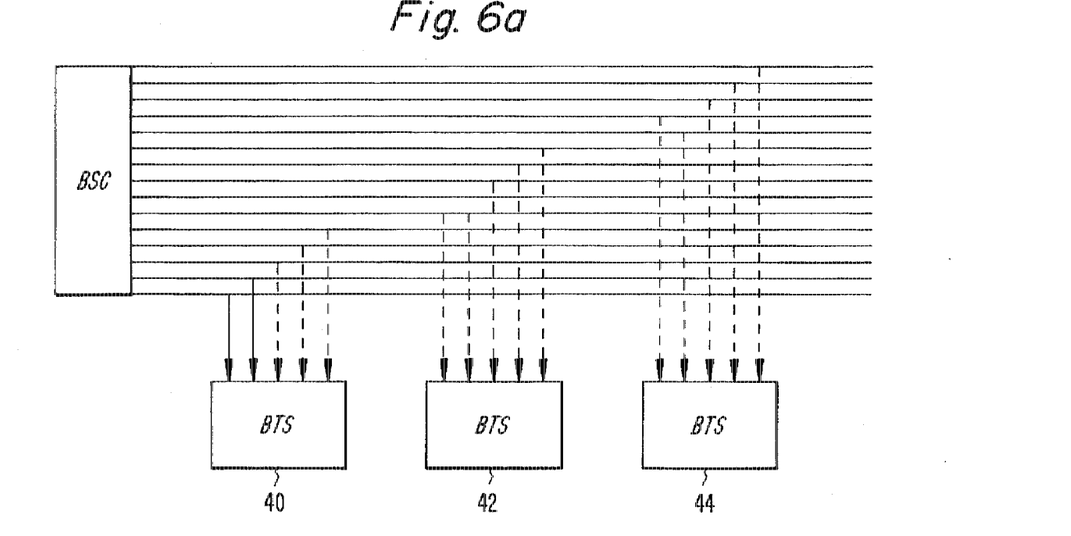
FIGS. 6a–6b illustrate a cellular communications system according to one embodiment of the present invention.
Figure 6B:
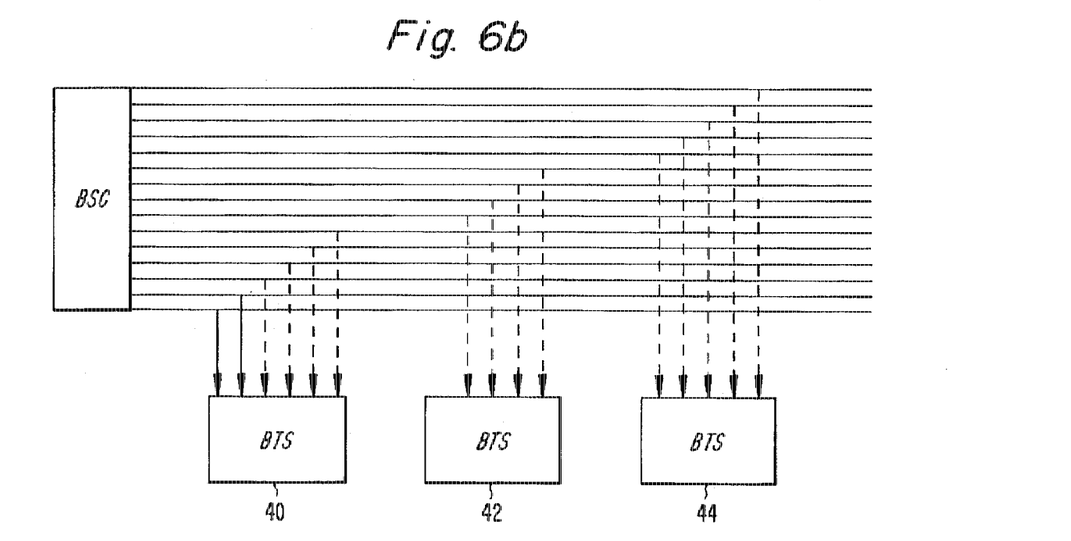

A background process is used to continuously monitor the number of preconfigured connections towards each node, and is able to determine which are idle and which are busy at any given instant. This process evaluates the current distribution of preconfigured resources vs. the number of idle channels which are preconfigured towards each remote node, and if it decides that the allocation is unbalanced, the system can re-configure one or more channels to improve that balance. Again the purpose of the preconfigured channels is to act as a buffer to decouple the ability to support the need for a connection from the ability to configure on in real time, but in this case the buffers are as large as possible. For example, if three identical nodes 40 42, and 44, illustrated in FIGS. 6a–6b, each have five channels in their buffer, and the node 40 uses two channels to support calls represented by the solid arrows, its buffer will only contain three idle channels represented by the dashed arrows. Thus, the end balance situation of 3/5/5 idle channels respectively are present. The system may decide to move a channel from the node 42 to the node 40 to restore a better balance of 4/4/5.

The present invention is based on the concept that as one node becomes busier than the other, rather than running out of transmission channels, it is better to scavenge resources from its neighbors when such idle resources are available, to help minimize the chance that its buffer will become exhausted and it will be unable to allocate a channel to the call. This works well in systems where the chance remains equal that the next call will arise in any of the nodes and the imbalance is a statistical one. However, in systems where the imbalance is significant, a different strategy is appropriate. According to another embodiment of the present invention, a background process seeks to arrange for the distribution of idle channels to be based on a function of the statistical likelihood of demand for channels towards each specific remote node in the future, based on either the relative current or a statistical analysis of the relative past allocation of channels towards the remote nodes. For example, in a system where three nodes cover different cells, one cell covering an industrial zone with a heavy call density during the day, a second cell covering a rural zone with peak call density by night, and a third cell covering a shopping center with peak call density during the weekend, all will have different peak times. Instead of simply trying to numerically balance the channels, the system might, for example, try to balance the idle channels in each buffer as a function of the number of busy calls in that node on the assumption that the likelihood of where the next call will arise is related to the current distribution of calls. This approach would allow the system to automatically track trends in call density, optimizing the buffer size and maximizing the adaptiveness and the confidence of the system. Generically, the balancer can use a wide range of algorithms to adaptively vary the magnitude of each node's buffer to the conditions at the time and in response to either historical or predictive inputs.

Figure 7A:
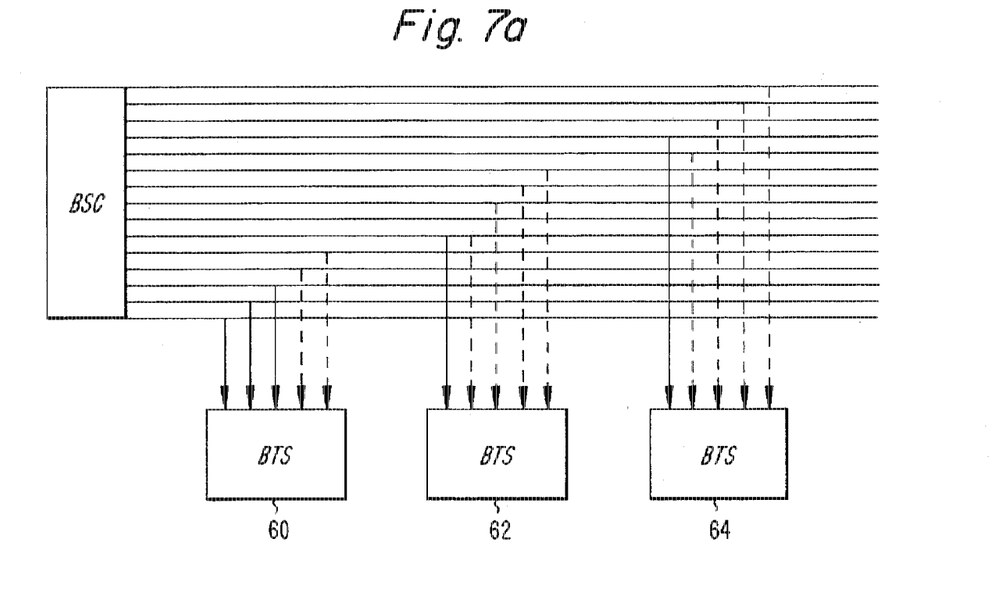
FIGS. 7a–7b illustrate a cellular communications system according to one embodiment of the present invention.
Figure 7B:
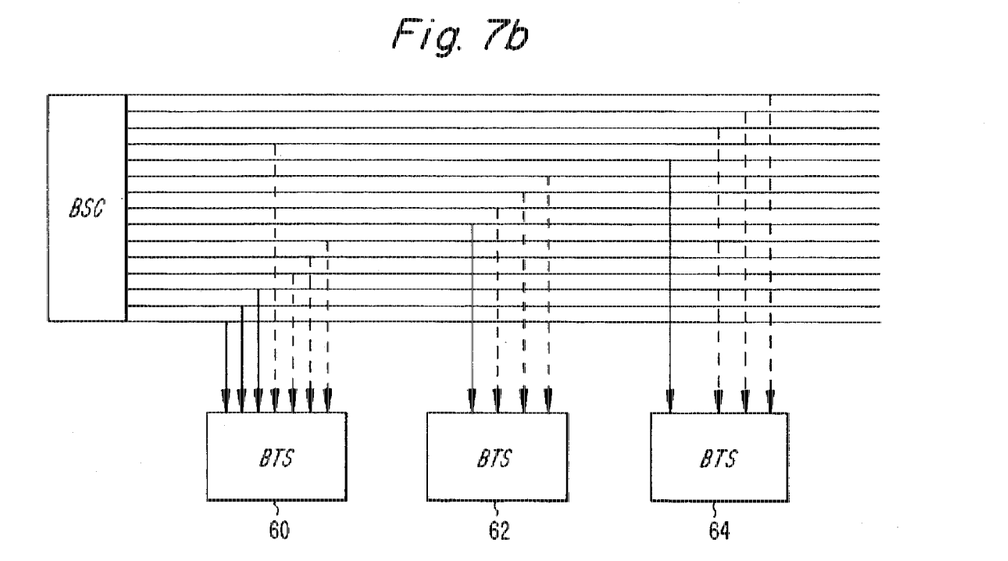

One implementation of this embodiment might be to strive to maintain the same ratio between the number of idle channels and the number of busy channels configured through to each node. For example, consider the case illustrated in FIGS. 7a–7b wherein three BTS 60, 62 and 64 each have 5 idle channels, represented by the dashed arrows, preconfigured as an initial state, i.e., 5/0, 5/0, 5/0, where the first number is the idle channels and the second number is the busy channels, which will be represented by the solid arrows. If the BTS 60 gains three calls and the other two BTS 62 and 64 only have one call each, the state becomes 2/3, 4/1, 4/1. This is clearly an imbalance situation, wherein the BTS 60 has more busy channels than idle channels while the other two BTS 62 and 64 have more idle channels than busy channels. The balancing process described above might therefore determine that one channel from each of the more lightly used BTS should be moved to the heavily used BTS to create a situation where the BTS have the states 4/3, 3/1, 3/1. However this embodiment of the present invention goes further than balancing on the reasoning that if there are three calls in the area served by the BTS 60, but only one each for the other two BTS, it might be reasonable to assume that the BTS 60 is serving an area with greater demand for connections at present, and thus it is likely that future connects will also arise more frequently in the BTS 60. In the balancing example above, it is seen that the busiest BTS is still left with only slightly more idle channels (one more) than the more lightly loaded BTS, despite being three times heavily loaded. Therefore, it might be more suitable to move two channels from each of the lesser used BTS 62 and 64 to the BTS 60 in order to give 6/3, 2/1, 2/1, i.e., a situation where there is an even ratio of twice as many idle channels as there are busy channels, thus there is less likely to be congestion in the busy BTS. It will be appreciated by one skilled in the art that more complex functions than a linear ration have interesting characteristics which may be of particular value in some scenarios.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced herein.

I claim:

1. A method of providing common resources to meet resource requests of a plurality of nodes which must be satisfied faster than the resources can be configured, comprising the steps of:

preconfiguring at least a plurality of resources before a resource request arises, said preconfigured resources being idle when not being used for a call, wherein any remaining resources are held back as an uncommitted reserve;

assigning each node a reserve of preconfigured resources;

receiving a resource request;

assigning the call an idle preconfigured resource from the preconfigured reserve of the node handling the resource request;

configuring uncommitted reserved channels to replenish the nodes reserve of preconfigured resources, wherein new resources are configured when the sum of preconfigured idle resources and already ordered but until configuring resources minus any ordered but still deconfiguring resources for the preconfigured reserve at a node drops below a first threshold;

releasing said resource to said reserve of preconfigured resources after a resource request ends; and deconfiguring resources in said reserves of preconfigured resources when the number of idle resources exceeds a second threshold.

2. A method according to claim 1, wherein preconfigured idle resources with a node are deconfigured when the sum of preconfigured idle resources and ordered but still configuring resources minus any ordered but still deconfiguring resources exceeds the second threshold.

3. A method according to claim 1, wherein said common resources are transmission channels from a base station controller in a cellular telephony system.

4. A method according to claim 1, wherein said nodes are base stations in a cellular telephony system.

5. A method according to claim 1, wherein said common resources are base station common equipment from a base station controller in a cellular telephony system.

6. A method according to claim 1, wherein said nodes are transceivers in a cellular telephony system.

7. A communications system which provides common resources to meet resource requests of a plurality of nodes which must be satisfied faster than the resources can be configured, comprising:

means for preconfiguring at least a plurality of resources before a resource request arises, said preconfigured resources being idle when not being used for a call, wherein any remaining resources are held back as an uncommitted reserve;

means for assigning each node a reserve of preconfigured resources;

means for receiving a resource request;

means for assigning the call an idle preconfigured resource from the preconfigured reserve of the node handling the resource request;

means for configuring uncommitted reserved channels to replenish the nodes reserve of preconfigured resources, wherein new resources are configured when the sum of preconfigured idle resources and already ordered but still configuring resources minus any ordered but still deconfiguring resources for the preconfigured reserve at a node drops below a first threshold;

means for releasing said resource to said reserve of preconfigured resources after a resource request ends; and means for deconfiguring resources in said reserves of preconfigured resources when the number of idle resources exceeds a second threshold.

8. A system according to claim 7, wherein preconfigured idle resources with a node are deconfigured when the sum of preconfigured idle resources and ordered but still configuring resources minus any ordered but still deconfiguring resources exceeds the second threshold.

9. A system according to claim 7, wherein said common resources are transmission channels from a base station controller in a cellular telephony system.

10. A system according to claim 7, wherein said nodes are base stations in a cellular telephony system.

11. A system according to claim 7, wherein said common resources are base station common equipment from a base station controller in a cellular telephony system.

12. A method according to claim 7, wherein said nodes are transceivers in a cellular telephony system.

* * * * *